United States Patent [19]

Krauter

[11] Patent Number: 5,052,803

[45] Date of Patent: Oct. 1, 1991

[54] MUSHROOM HOOK CAP FOR BORESCOPE

[75] Inventor: Allan I. Krauter, Syracuse, N.Y.

[73] Assignee: Welch Allyn, Inc., Skaneateles Falls, N.Y.

[21] Appl. No.: 451,016

[22] Filed: Dec. 15, 1989

[51] Int. Cl.$^5$ .............................................. G02B 5/16
[52] U.S. Cl. ................................................... 356/241
[58] Field of Search ...................... 356/241; 294/19.1; 415/118; 350/96.26

[56] References Cited

U.S. PATENT DOCUMENTS

| 3,841,764 | 10/1974 | Snell et al. | 356/241 |
| 4,298,312 | 11/1981 | MacKenzie et al. | 350/96.26 |
| 4,848,817 | 7/1989 | Hasegawa | 294/19.1 |

FOREIGN PATENT DOCUMENTS 2036363   3/1980   United Kingdom ................ 356/241

*Primary Examiner*—Richard A. Rosenberger
*Attorney, Agent, or Firm*—Wall and Roehrig

[57] ABSTRACT

A flexible borescope for penetrating a passage into an inaccessible area of a jet engine or other device to be visually inspected has an imaging system disposed at its distal tip and conducts the image to a viewing device coupled to a proximal end of the insertion tube. A hooking cap removably attached onto the distal tip of the insertion tube can be controllably latched onto and removed from a projection in the inaccessible area, for example, onto the trailing edge of one of the blades of the rotor. The hooking cap has a circumferential sleeve that overfits the tip and a flange that projects radially outward from the sleeve sufficiently to hook over the projection. The insertion tube carries at least one longitudinal stripe over its operational length to indicate the bending plane of the borescope bendable steering section, so that the operator can judge the orientation of the bending section when the borescope is being inserted into the jet engine or other inaccessible area.

17 Claims, 4 Drawing Sheets

MUSHROOM HOOK CAP FOR BORESCOPE

BACKGROUND OF THE INVENTION

The present invention relates to industrial borescopes, especially flexible borescopes of the type that can be employed to inspect the condition of a gas turbine or jet engine.

Borescopes of this type have elongated flexible probes, which can have either a miniature video camera at the distal tip or a fiber optic imaging system. These probes are employed to penetrate into an inaccessible area of a jet engine or other object to view a target area inside it. Flexible borescopes are often employed to inspect vanes of a stator row in a turbine for foreign object damage. An aeronautical jet engine typically receives, through an inspection port, a guide tube which extends from outside the engine to a position near a first stator row. The flexible probe is inserted through the guide tube and then is passed through the first stator row into a rotor. There, the tip of the flexible probe latches onto a trailing edge of one of the rotor vanes, or else is wedged between two adjacent rotor vanes. The jet engine maintenance operator can then observe the leading edges of the next stator row as the rotor is slowly turned. This procedure typically permits inspection of one half of the stator vanes. Then, the rotor is reversed one half turn and the probe is removed. Following this, the probe and guide tube are inserted into a second inspection port and the remaining stator vanes are inspected in a similar fashion. In some engines, only one inspection port is available so that the borescope must be sufficiently long to inspect all the stator vanes. Inspection by means of a flexible borescope permits the most susceptible parts of the jet engine or gas turbine to be inspected without disassembling the engine.

A flexible probe which employs an inflatable bladder mechanism for lodging the borescope tip between rotor vanes is described in U.S. Pat. No. 3,841,764. Probes of this type require an inflatable bag or bladder, an inflating mechanism, and an air tube which runs the length of the flexible probe beneath its outer sheath.

Another borescope employs a forceps hook to latch onto the trailing edge of the rotor blades, and is described in U.S. Pat. No. 4,847,817. In this arrangement, an aluminum hook is screwed onto an elongated flexible cable that passes through a tool forceps channel within the insertion tube. In arrangements of this type, the hook can become difficult to manipulate as the operator is required to rotate the cable within the forceps channel to orient the hook.

Both of the above-mentioned prior systems require the borescopes to have additional channels within them, either to inflate the bladder, or to carry the hook cable. Consequently, the borescope insertion tube is of a greater diameter and is somewhat more complex and costly than if the additional channels were omitted.

OBJECTS AND SUMMARY OF THE INVENTION

Accordingly, it is a object of this invention to facilitate the visual inspection of the stator row of a jet engine or gas turbine with a borescope or similar elongated flexible probe.

It is another object of this invention to provide simple structure which can be easily attached onto a trailing edge of a rotor vane, and then can be removed from the rotor vane without difficulty when desired.

It is yet another object of this invention to provide attachment structure which permits the use of a flexible optical or video borescope without a forceps channel or fluid conduit.

It is still another object of this invention to provide an attachment device for a jet engine inspection probe which can have either two-way or four-way steering.

In accordance with a significant aspect of this invention, a flexible borescope has an elongated flexible insertion tube for penetrating a passage into an inaccessible area of a device to be visually inspected, such as the turbine mechanism of a jet engine. The probe has an imaging system, which can be e.g. a miniature video camera or a fiber optic system, disposed at the distal tip of the insertion tube for forming an image of a target in the inaccessible area and for conducting the image to a viewing device that is coupled to a proximal end of the insertion tube. A hooking device is removably attached onto the distal tip of the insertion tube for controllably latching onto a projection in an inaccessible area, such as the trailing edge of a rotor vane. The hook device includes a circumferential sleeve that overfits the insertion tube tip and a flange that projects substantially radially out from the sleeve sufficiently to hook over the rotor vane trailing edge or other projection.

In one preferred embodiment, the insertion tube has a steerable bending section disposed adjacent to the tip and which is bendable in one bending plane under control of a control unit coupled to the proximal end of the insertion tube. Here, the insertion tube has a longitudinal stripe on it over its operational length to correspond to the bending plane of the steerable bending section. This permits the maintenance operator to judge the orientation of the bending section when the borescope distal tip is within the jet engine or another inaccessible area.

In a preferred version of the hooking device, the sleeve has one or more inwardly projecting lips that engage corresponding transverse slots into the insertion tube tip, with the lips being constructed to release from the slots if a predetermined axial breakaway force is applied onto the hooking device. The flange can be generally annular or polygonal, or can consist of two or more lobes that project only from predetermined circumferential portions of the sleeve. Preferably, the front or distal surface of the flange is arcuate or rounded to facilitate insertion, while the back or proximal surface of the flange is flat or angled back somewhat.

It has been found that the flange or rim of the hooking cap can be easily and securely hooked over the trailing edge of the jet engine rotor blades, and will not come off inadvertently. However, when desired to remove the probe from the engine, the radial flange can be dislodged by rotating the insertion tube. This causes the flange to roll over the trailing edge of the blade and become dislodged.

The hooking device is unitarily fabricated of aluminium. If the cap is lost in the jet engine, it will be consumed at the engine's characteristic operating temperatures, and this will not cause any damage.

The probe is employed by inserting it through the guide tube which has been installed in the inspection port, and hooking the flange over the trailing edge of a rotor blade. Then the rotor is turned for a half rotation, so that the leading edges of the next row of stator vanes come into view. After these stator vanes have been inspected, the rotor is turned back to its original position. The operator then simply twists the insertion tube to dislodge the cap by rolling it off from the rotor blade. Then the probe is pulled out of the guide tube and a similar procedure is employed using the second inspection port. The probe is inserted through the guide tube which has been installed in this second port, and is used to inspect the remaining stator vanes. In some engines only one inspection port is available, so that the rotor is turned a full rotation to inspect the stator vanes.

The above and many other objects, features, and advantages of this invention will be more fully understood from the ensuing description of a preferred embodiment, which is to be read in connection with the accompanying Drawing.

DETAILED DESCRIPTION OF THE PREFERRED EMBODIMENT

Figure 1:
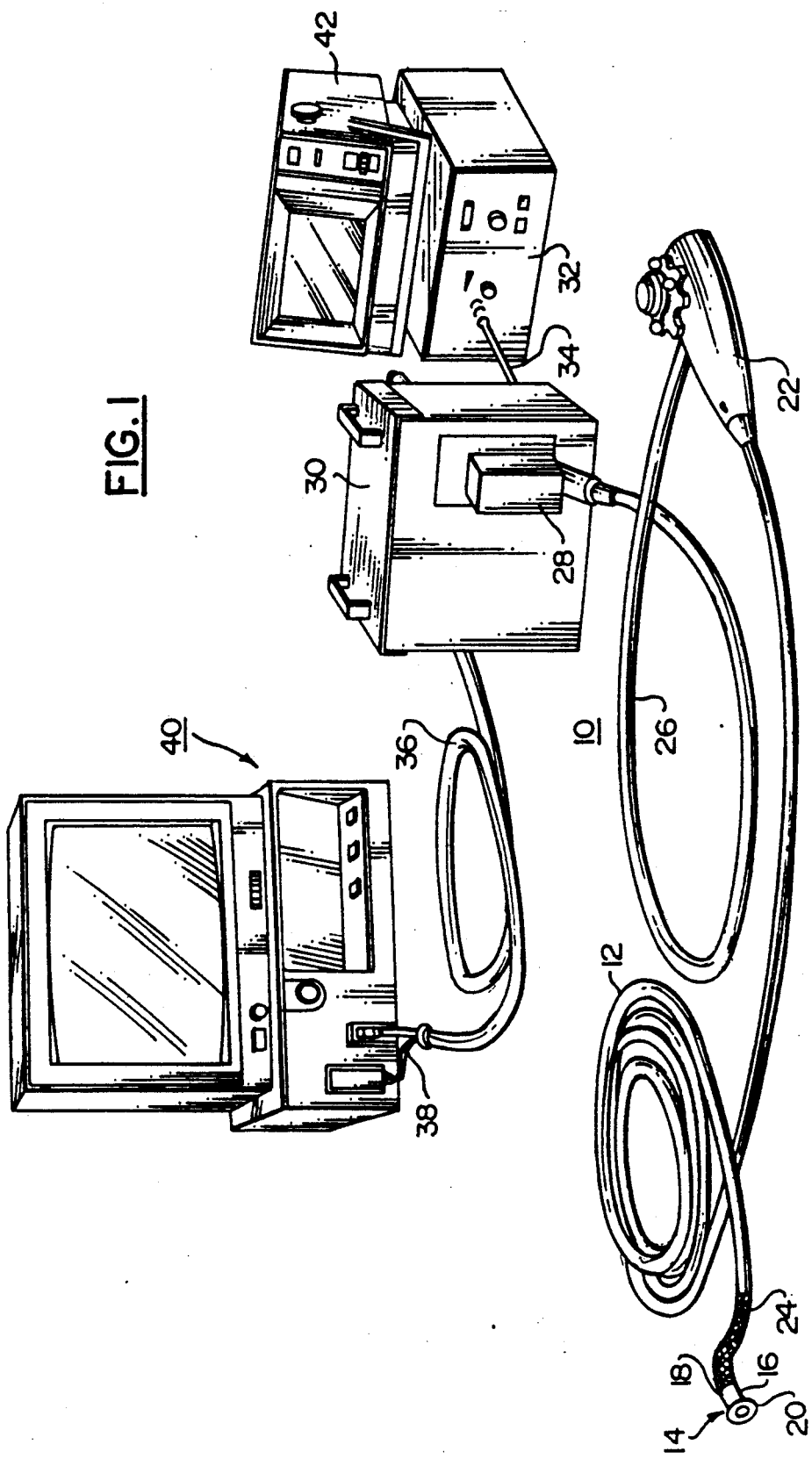
FIG. 1 is a perspective assembly view of a borescope that employs a mushroom hook cap hooking device according to one embodiment of this invention.

With reference to the Drawing, FIG. 1 shows a video borescope assembly 10 which comprises an elongated flexible insertion tube 12 that can be up to 50 feet (16 meters) in length and which has a viewing head 14 incorporated into its distal tip. This viewing head contains an optical lens and a miniature video camera. The latter can be formed of a CCD device or other solid-state imager capable of providing a full-color image of a remote target area e.g. the inside of a boiler tube heat exchanger or a stator vane of a jet engine or gas turbine. An example of a suitable solid state imager is disclosed in U.S. Pat. No. 4,491,865.

At the distal tip of the insertion tube, there is a hooking device in the form of a mushroom end cap 16. The cap 16 has a generally tubular sleeve 18 that overfits the borescope tip 14 and a radial flange 20 that extends outward from the distal end of the sleeve 18.

At the back or proximal end of the insertion tube 12 is a steering and control unit 22 that can be manipulated by an operator to bend a steering section 24 at the front or distal end of the insertion tube adjacent the viewing head 14. The control unit 22 couples the insertion tube 12 to a flexible tubular umbilical 26. At the proximal end of the umbilical 26 is a borescope interface module 28 of the plug-in type, substantially as disclosed in U.S. Pat. No. 4,539,586. In this embodiment, the module 28 fits a mating receptacle in an auxiliary light box 30, which can be of the type disclosed in U.S. Pat. No. 4,583,774. This light box is coupled in turn to an auxiliary illumination source 32 by means of a suitable flexible light conduit 34. An auxiliary umbilical 36, which is a flexible sheath containing a plurality of conductors, extends from a rear side of the auxiliary light box 30 and has an auxiliary interface module 38 that fits a receptacle on a video processor unit 40. If the auxiliary light box is not needed, the module 28 can be plugged directly into the video processor unit 40. Also shown in FIG. 1 is an auxiliary video monitor 42, which can be remoted to the site of the auxiliary light box 30.

In this embodiment, the steering section 24 bends in one direction only, that is, to the left and to the right in a horizontal plane. A stripe 43 appears on the sheath of the insertion tube 12 and extends axially over the operative length of the insertion tube. This stripe 43 lies on the horizontal plane, i.e., the bending plane of the steering section 24. The stripe provides a visual indication to the operator of the orientation of the insertion tube 12 and steering section 24 when the borescope is inserted into an inaccessible area. This is a significant advantage to the operator in orienting the borescope and threading the same through the stator and rotor vanes of a jet turbine so that the flange 20 of the cap 16 can be easily hooked onto the trailing edge of one of the rotor vanes. For a probe with four-way steering, distinctive strips or markings on the sheath would indicate both the horizontal and vertical steering planes.

Figure 2:
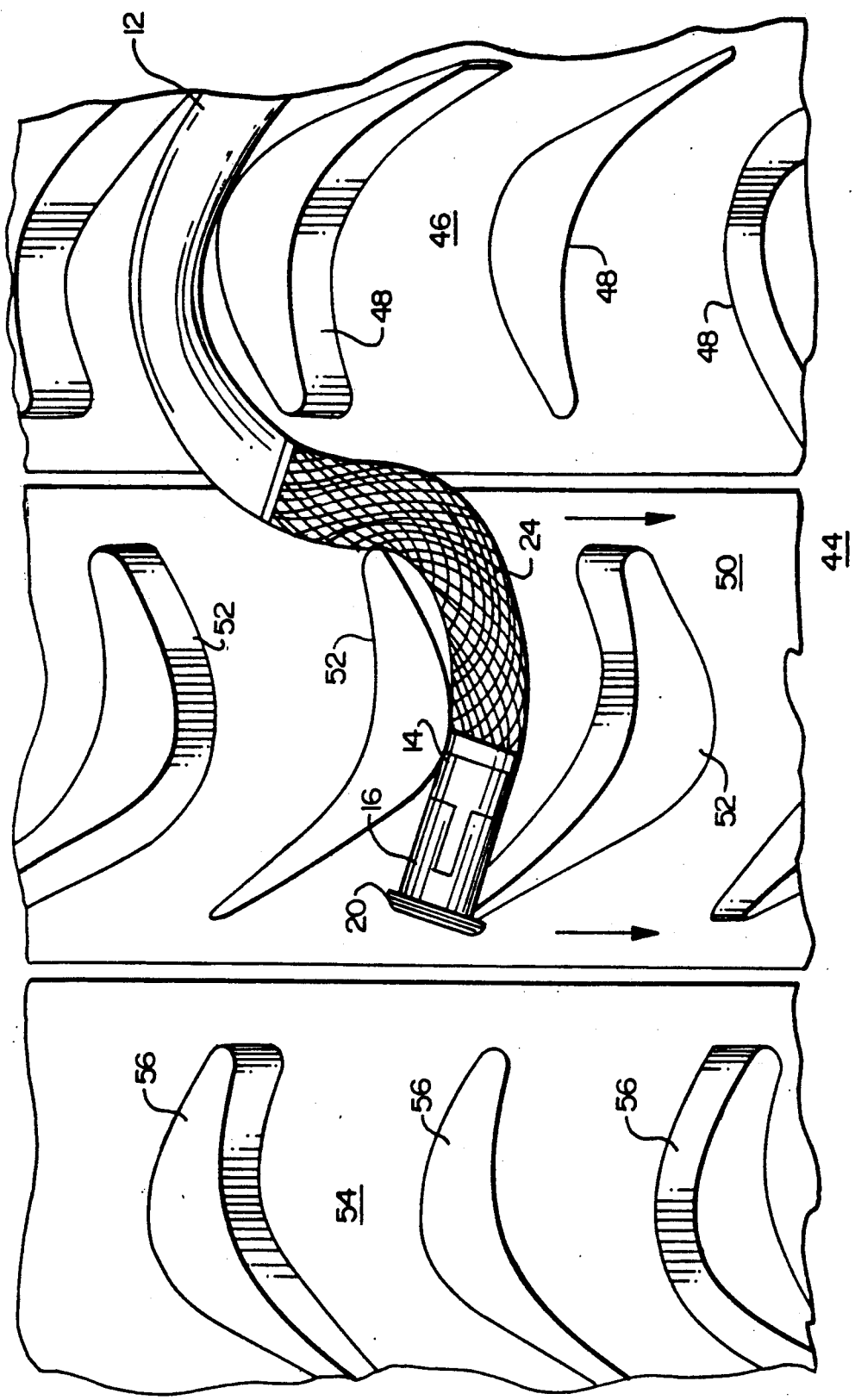
FIG. 2 is a sectional representation of a portion of a turbine jet engine in which the borescope of this invention is employed for inspection purposes.

FIG. 2 shows the distal end of the borescope insertion tube 12 after having penetrated into a jet engine 44 for inspection of same. In this drawing, the direction of gas flow is from right to left, so that the leading edges of the stator vanes and rotor blades are to the right, and their trailing edges are to the left.

The engine 44 has a first stator row 46 formed of a plurality of spaced stator vanes 48, a rotor 50, on which there are a plurality of spaced rotor blades 52, and a second stator row 54 which has a plurality of spaced stator vanes 56. The vanes 48, 56, and blades 52 have rounded leading edges and pointed trailing edges. Generally, the first row stator vanes 48 and the rotor blades 52 can be inspected without difficulty. However, it is the leading edges of the stator vanes 56 of the second row that are most subject to hidden damage and it is these vanes 56 that require the subject probe for inspection.

Rotor and stator elements behind the second stator row 54 have a low incidence of damage, making routine inspection unnecessary in most cases.

To inspect the leading edges of the vanes 56, the borescope insertion tube 12 is inserted through a guide tube (not shown) which has been inserted into an inspection port (not shown) of the engine 44. The guide tube positions the insertion tube to enter between a pair of the first row stator blades 48. The operator maintains the bending plane horizontal, i.e., to conform with the curve in the blades 52, by observing both the stripe 53 on the insertion tube and the image on the monitor. The insertion tube is passed between a pair of blades 52 of the rotor 50. Then, by manipulating the control unit 22, the operator latches the flange 20 of the cap 16 onto the trailing edge of one of the rotor blades 52. The rotor 50 is then slowly turned in the direction of the arrows of FIG. 2, and this carries the insertion tube so that the tip 14 passes each of the stator vanes 56 in succession. After these vanes 56 have been inspected, the rotor 50 is turned reversely back to its original position for withdrawal of the insertion tube 12. To unlatch the cap 16, the operator relaxes the bending section 24 and rotates the insertion tube 12. This causes the flange 20 to roll out of engagement with the trailing edge of the blade 52.

With the above-described procedure, half of the total rotor vanes 56 are typically inspected. The operation is repeated to inspect the remaining half by inserting the borescope 10 through the guide tube into a radially opposite inspection port on the other side of the engine 44, and then employing like procedures to inspect the remaining stator vanes 56.

It has been found that the generally mushroom-shaped hook cap 16 of this invention is far easier to employ, in terms of both making the necessary engagement with and disengagement from the rotor blade trailing edges. Also, because the cap 16 employs no moving parts which must be manipulated through a forceps channel or air conduit, the borescope insertion tube can be made without provision for such conduits or channels. Thus, with this invention, the borescope that is employed can be made thinner and more flexible than was possible previously.

Figure 3:
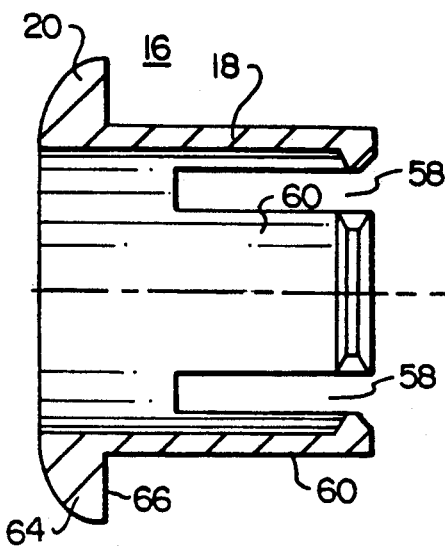
FIG. 3 is a sectional view and FIG. 4 is a proximal-to-distal end view of the hooking cap, FIG. 3 being taken along plane 3—3 in FIG. 4.
Figure 4:
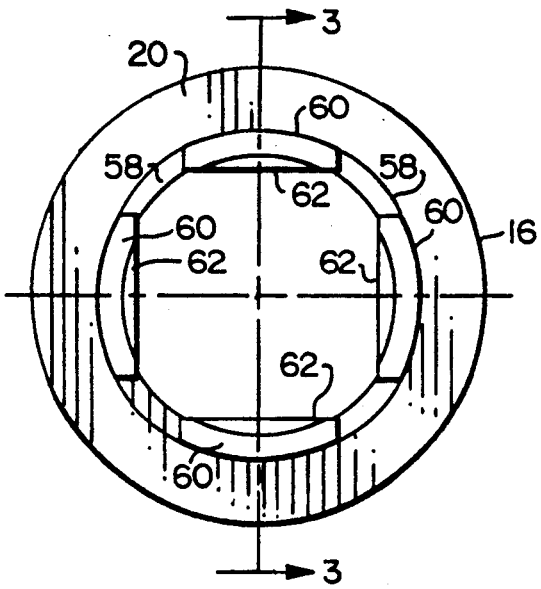
Figure 5:
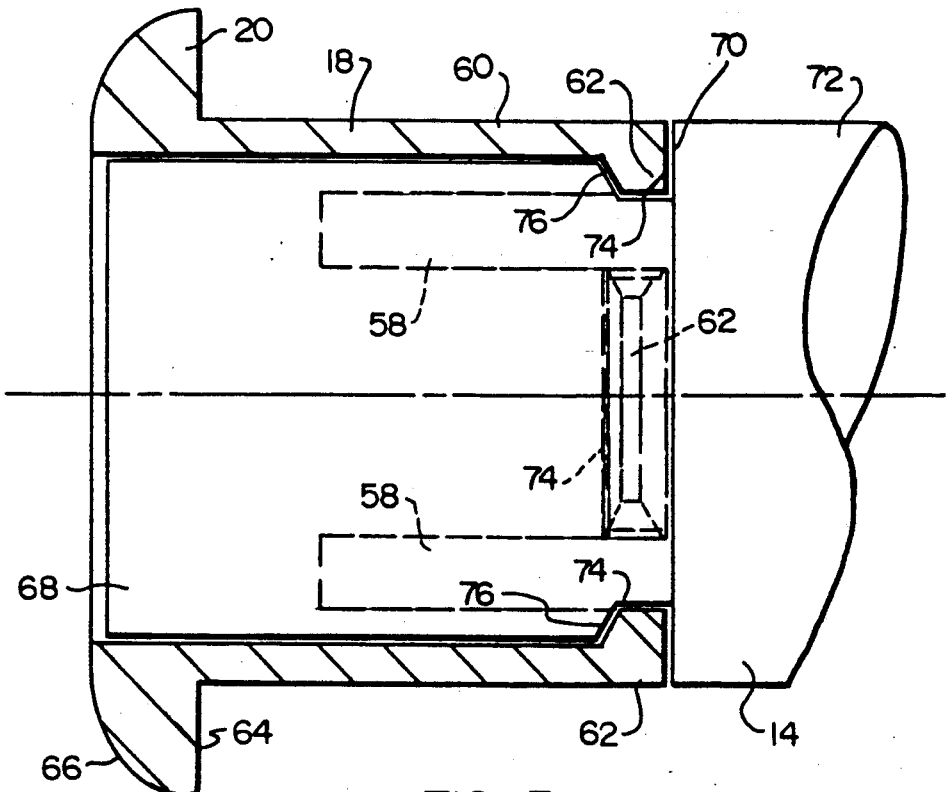
FIG. 5 is a sectional view of a borescope and hooking cap in place on the distal tip of the borescope.

Details of the mushroom-shaped hook cap 16 according to a preferred embodiment are shown in FIGS. 3, 4, and 5. In this cap 16 the sleeve 18 is generally cylindrical and has a plurality of axial slots 58 which extend from the proximal or rear end part way towards the distal end, to define a plurality of fingers 60. At the proximal end of each of the fingers 60 there is a lip 62 that projects radially inward. Each lip 62 has chamferred proximal and distal sides which facilitate installation of the cap and break away of the cap from the insertion tube tip 14 if a predetermined force is exceeded. The break away provision permits the insertion tube 12 to be removed from the engine in case where the cap 16 becomes jammed. Because the cap 16 is formed entirely of soft aluminum, a material which becomes entirely consumed at the combustion temperatures of the jet engine, a lost cap 16 can remain in the engine without threat of damage to any of the rotor blades or stator vanes.

The flange 20 is generally annular, that is, it has a circular profile, with an arcuate front of distal surface 64 and a flat back surface 66. The arcuate front surface 64 facilitates threading of the borescope through the passages of the jet engine 44, while the flat proximal surface 66 facilitates the hooking of the flange 20 onto the rotor blade 52.

As shown in FIG. 5, the probe head at the distal tip 14 has a distal or front section 68 of reduced diameter and a shoulder 70 which connects to a proximal section 72 of a greater diameter. Preferably, the proximal section 72 has the same diameter as the remainder of the insertion tube 12.

There are transverse slots 74 provided at the shoulder 70 to receive the lips 62 of the cap 16. These transverse slots have chamferred distal sides 76 of predetermined slope to facilitate break away. It should be understood that the elasticity of the aluminum material, and the sizes of the slots 58 and degree of chamfer of the lips 62 and the surface 76 are selected so that a predetermined break away force is predictably established.

Figure 7:
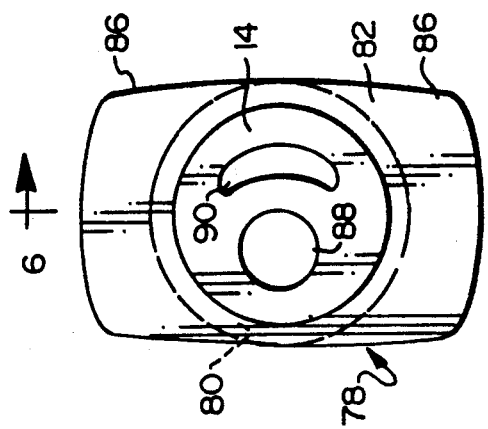
FIGS. 6 and 7 are a sectional elevation and an end view of a borescope end cap according to an alternative embodiment, FIG. 6 being taken along plane 6—6 of FIG. 7.
Figure 6:
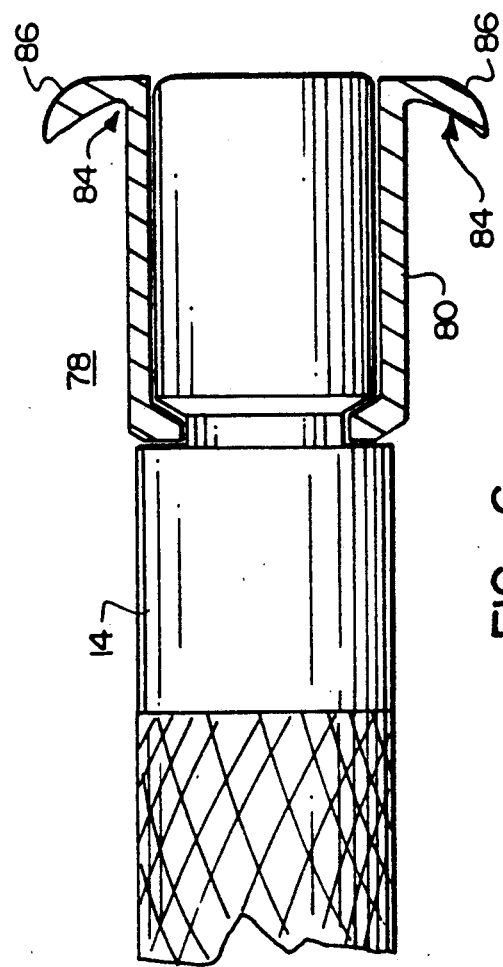

An alternative embodiment of this invention is shown in FIGS. 6 and 7. In this embodiment, a hooking cap 78 has a generally cylindrical sleeve 80 and a flange 82 that extends generally in the radial direction, but in which the proximal surface 84 is angled back somewhat, i.e. extending at least slightly in the proximal direction. As shown in FIG. 7, the flange 82 is formed of a pair of oppositely directed lobes 86. Thus, in this embodiment, the flange 82 occupies only predetermined portions of the circumference of the sleeve 80.

As shown in this embodiment, the cap 78 is employed with a video type probe, in which a front or distal surface of the head or tip 14 has a video imager 88 or miniature video camera and a fiber optics illumination bundle 90. It should be understood that the same type of hooking cap could be employed with equal facility on a so-called fiberscope, that is, on the type of borescope in which a fiber optic bundle carries an image to the viewing device disposed at the proximal end of the probe.

Figure 8:
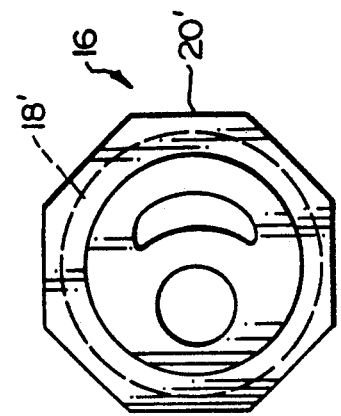
FIG. 8 is an end view of a borescope and cap according to an additional embodiment of this invention.

Yet another version of the cap is shown in FIG. 8 whose construction is generally the same as that shown in FIGS. 1–5, and in which similar features are identified with the same reference numbers except primed. In this cap 16', a generally octagonal flange 20' extends radially outward from the sleeve 18'. While this flange 20' has the profile of a regular octagon, the flange in other embodiments could have any polygonal form, regular or irregular. In still other embodiments, the flange can be formed directly on the distal tip of the borescope, or the cap can be permanently affixed onto the distal tip.

While the invention has been described in detail with reference to a few selected preferred embodiments, it should be understood that the invention is not limited to those precise embodiments, rather, many modifications and variations would present themselves to those skilled in the art without departing from the scope and spirit of this invention, as defined in the appended claims.

What is claimed is:

1. A flexible borescope comprising a flexible elongated insertion tube for penetrating a passage into an inaccessible area of a device to be visually inspected, imaging means disposed in a distal tip of said insertion tube for forming an image of a target in said inaccessible area and conducting the image to a viewing device coupled to a proximal end of the insertion tube, and hook means removably attached onto the distal tip of the insertion tube for controllably latching onto a projection in said inaccessible area, the hook means including a sleeve circumferentially overfitting said tip and a flange projecting substantially radially from said sleeve sufficiently to hook over said projection.

2. The flexible borescope of claim 1, said insertion tube including a steerable bending section disposed adjacent said tip which is bendable in at least one bending plane under control of a control device coupled to the proximal end of the insertion tube, and wherein said insertion tube has at least one longitudinal stripe or marking thereon substantially over its operational length to correspond to said bending plane such that an operator can judge the orientation of the bending section bending plane where the borescope distal tip is in said inaccessible area.

3. The flexible borescope of claim 1 wherein said tip has a reduced-diameter distal section and a shoulder joining said distal section to the remainder of the tip, and said sleeve is a generally cylindrical member fitting onto said distal section.

4. The flexible borescope of claim 3 wherein said tip has at least one transverse slot adjacent said shoulder, and said sleeve has a corresponding at least one inwardly projecting lip to engage the corresponding slot, the lip releasing from said slot if a predetermined axial force is applied onto said hook means.

5. The flexible borescope of claim 4 wherein said tip has a plurality of said transverse slots disposed at regular intervals and said sleeve includes a like plurality of regularly disposed fingers that project proximally, each carrying a respective one of said lips.

6. The flexible borescope of claim 1 wherein said flange is generally annular.

7. The flexible borescope of claim 1 wherein said annular flange has an arcuate distal surface and a generally flat proximal surface.

8. The flexible borescope of claim 1 wherein said flange is generally polygonal.

9. The flexible borescope of claim 1 wherein said flange projects only from predetermined portions of said sleeve.

10. The flexible borescope of claim 1 wherein said flange has a proximal surface that angles at least slightly in the proximal direction.

11. A hooking cap which is adapted to attach to a distal tip of an elongated flexible borescope, the hooking cap comprising an open, generally cylindrical sleeve which overfits the distal tip of the borescope, a radial flange at a distal end of said sleeve, at least one inwardly-directed lip formed at a proximal end of said sleeve for engaging a mating transverse slot in said distal tip, and means in said proximal end of said sleeve permitting flexure of said sleeve for disengaging at least one said lip from the associated slot if a predetermined axial breakaway force is exceeded.

12. The hooking cap of claim 11 wherein said means permitting flexure of said sleeve includes a plurality of axial slots extending distally from said at least one lip.

13. The hooking cap of claim 11 wherein said flange is generally annular with an arcuate distal surface and a generally flat proximal surface.

14. The hooking cap of claim 11 wherein said flange is formed of a pair of radial oppositely directed lobe members.

15. The hooking cap of claim 11 wherein said flange has proximal surface that is angled at least slightly in the proximal direction.

16. The hooking cap of claim 11 wherein said flange is generally polygonal.

17. The hooking cap of claim 11 wherein said tubular sleeve has an open distal end to permit viewing therethrough from the distal tip of the borescope.

* * * * *